US009396897B1

(12) United States Patent
Ademola

(10) Patent No.: US 9,396,897 B1
(45) Date of Patent: Jul. 19, 2016

(54) TIMED ELECTRICAL POWER STRIP ASSEMBLY

(71) Applicant: Omotolani M. Ademola, Pawtucket, RI (US)

(72) Inventor: Omotolani M. Ademola, Pawtucket, RI (US)

(*) Notice: Subject to any disclaimer, the term of this patent is extended or adjusted under 35 U.S.C. 154(b) by 410 days.

(21) Appl. No.: 14/033,125

(22) Filed: Sep. 20, 2013

(51) Int. Cl.
*H02J 1/10* (2006.01)
*H02J 3/00* (2006.01)
*H02J 3/14* (2006.01)
*H02M 1/10* (2006.01)
*H01H 47/00* (2006.01)

(52) U.S. Cl.
CPC . *H01H 47/00* (2013.01); *H02J 3/00* (2013.01)

(58) Field of Classification Search
CPC .................... H01H 47/00; H02J 3/00
USPC .......................................... 307/29
See application file for complete search history.

(56) References Cited

U.S. PATENT DOCUMENTS

| | | | | |
|---|---|---|---|---|
| 5,430,598 | A * | 7/1995 | Rodolfo | H01H 47/001 307/141 |
| 6,315,604 | B1 * | 11/2001 | Lee | H01R 13/516 439/535 |
| D460,363 | S | 7/2002 | Chen | |
| 6,476,523 | B1 | 11/2002 | Lee | |
| D514,001 | S | 1/2006 | Echito et al. | |
| 7,274,303 | B2 | 9/2007 | Dresti et al. | |
| 8,106,541 | B1 | 1/2012 | Sarullo | |
| 2005/0036258 | A1 * | 2/2005 | Ma | G05D 23/1909 361/103 |
| 2009/0146494 | A1 * | 6/2009 | Mori | G06F 1/266 307/38 |
| 2009/0195349 | A1 * | 8/2009 | Frader-Thompson | G01D 4/002 340/3.1 |
| 2009/0215319 | A1 | 8/2009 | Gandhi | |
| 2009/0261661 | A1 * | 10/2009 | Finneran | H02J 9/005 307/141.8 |
| 2010/0145543 | A1 * | 6/2010 | Middlemiss | G06F 1/266 700/295 |
| 2011/0213510 | A1 | 9/2011 | Mozayeny | |
| 2013/0200704 | A1 * | 8/2013 | Pyle | H02J 3/00 307/31 |

* cited by examiner

*Primary Examiner* — Rexford Barnie
*Assistant Examiner* — Toan Vu

(57) ABSTRACT

A timed electrical power strip assembly allows each of a plurality of electrical outlet receptacles to be controlled by a separate timer. The assembly includes a power strip housing having a top wall, a bottom wall and a peripheral wall attached to and extending between the top and bottom walls. A plurality of electrical outlet receptacles is disposed within the housing and extends through the top wall. Each of the receptacles has a plurality of openings therein wherein each of the openings is configured to receive a male plug-in end of an external electrical cord. A plurality of individual timer switches is provided. Each of the individual timer switches is electrically coupled to an associated receptacle wherein manipulation of the individual timer switches selectively provides power to the associated one of the receptacles for a selectable period of time.

16 Claims, 4 Drawing Sheets

TIMED ELECTRICAL POWER STRIP ASSEMBLY

BACKGROUND OF THE DISCLOSURE

Field of the Disclosure

The disclosure relates to power strip assemblies and more particularly pertains to a new power strip assembly for allowing each of a plurality of electrical outlet receptacles to be controlled by a separate timer.

SUMMARY OF THE DISCLOSURE

An embodiment of the disclosure meets the needs presented above by generally comprising a power strip housing having a top wall, a bottom wall and a peripheral wall attached to and extending between the top and bottom walls. A plurality of electrical outlet receptacles is disposed within the housing and extends through the top wall. Each of the receptacles has a plurality of openings therein wherein each of the openings is configured to receive a male plug-in end of an external electrical cord. A plurality of individual timer switches is provided. Each of the individual timer switches is electrically coupled to an associated receptacle wherein manipulation of the individual timer switches selectively provides power to the associated one of the receptacles for a selectable period of time.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
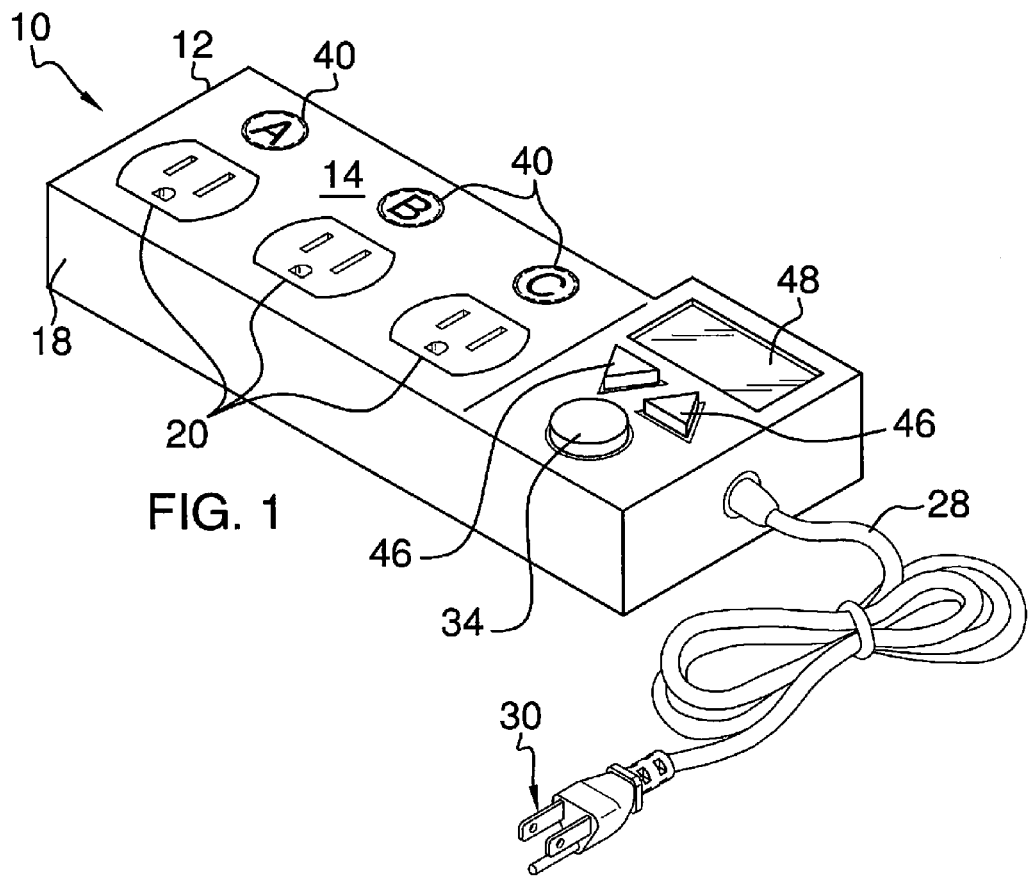
FIG. 1 is a top front side perspective view of a timed electrical power strip assembly according to an embodiment of the disclosure.
Figure 2:
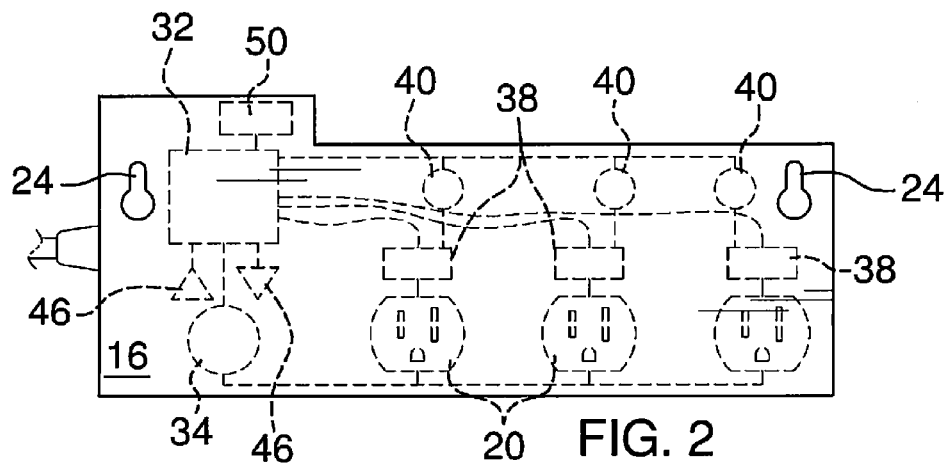
FIG. 2 is a bottom view of an embodiment of the disclosure.

With reference now to the drawings, and in particular to FIGS. 1 through 6 thereof, a new power strip assembly embodying the principles and concepts of an embodiment of the disclosure and generally designated by the reference numeral 10 will be described.

As best illustrated in FIGS. 1 through 6, the timed electrical power strip assembly 10 generally comprises a power strip housing 12 having a top wall 14, a bottom wall 16 and a peripheral wall 18 attached to and extending between the top 14 and bottom 16 walls. The housing 12 may be elongated. A pair of mounting holes 24 is positioned in the housing 12. The mounting holes 24 may extend into the bottom wall 16 of the housing 12 and are configured for receiving a fastener therethrough to releasably mount the housing 12 to a supporting surface, such as a wall, desk or the like.

Figure 3:
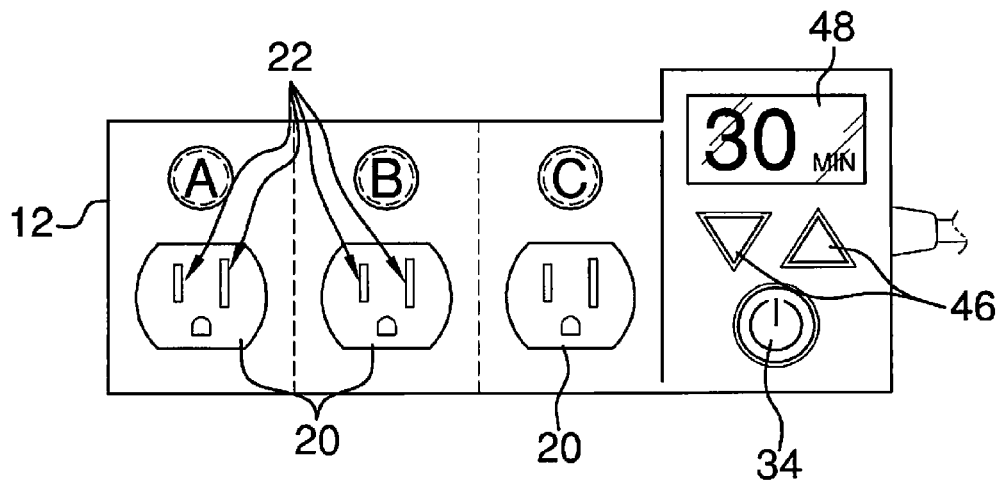
FIG. 3 is a top view of an embodiment of the disclosure.
Figure 4:
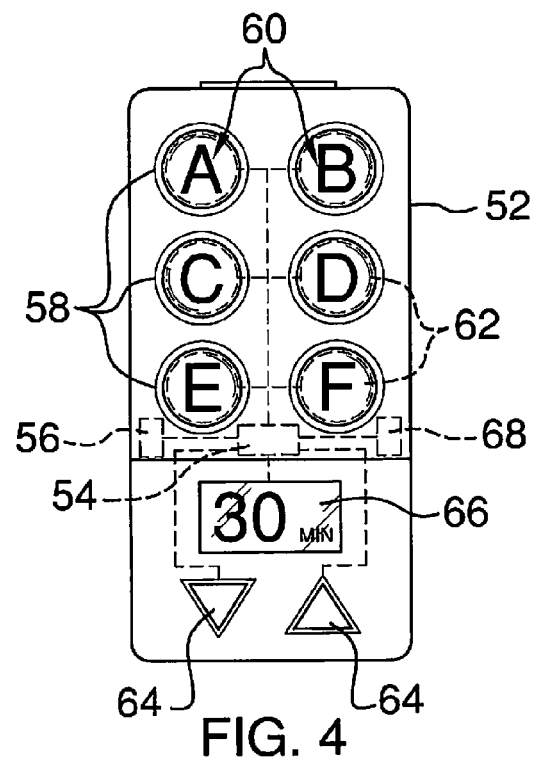
FIG. 4 is a top view of a remote of an embodiment of the disclosure.
Figure 5:
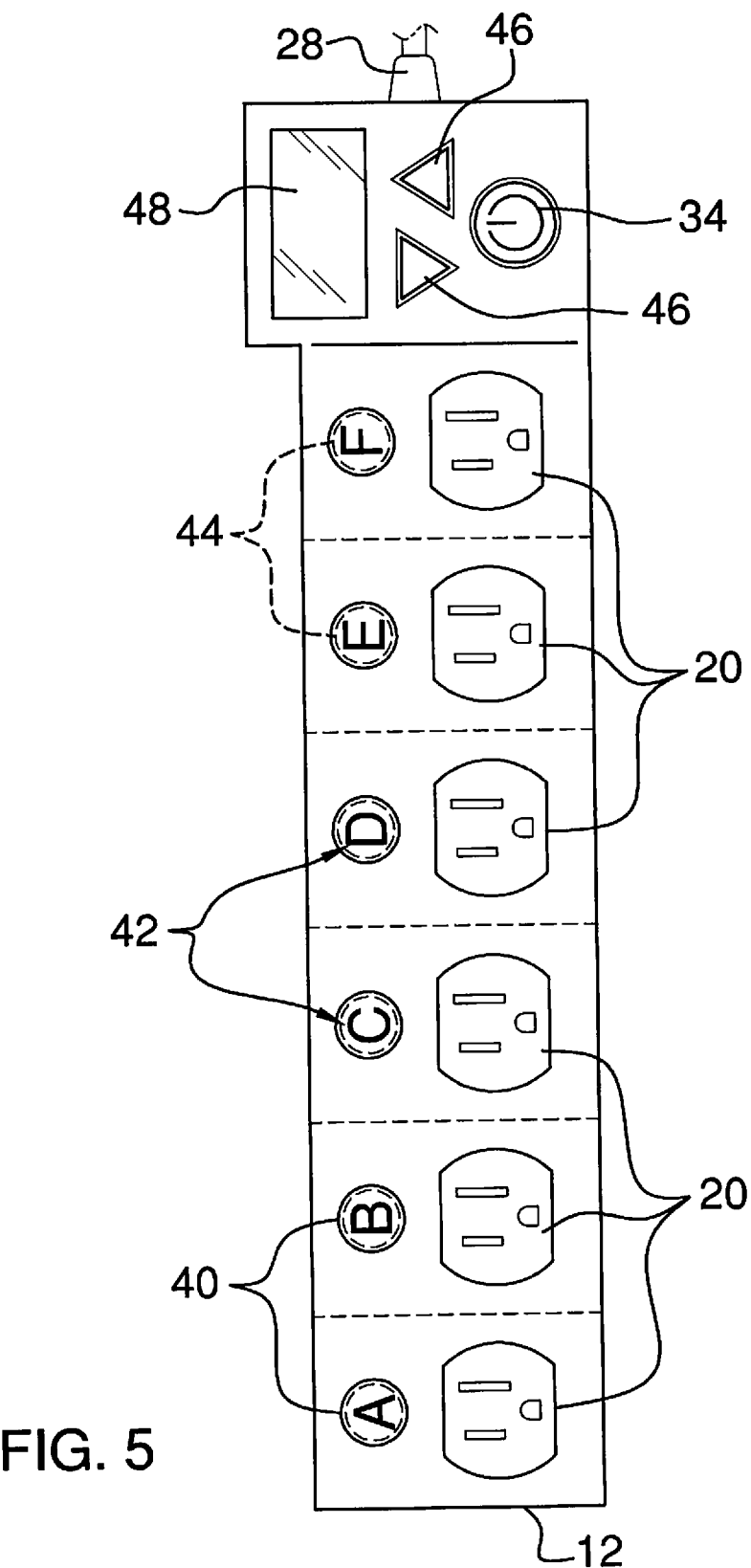
FIG. 5 is a top view of an alternative embodiment of the disclosure.
Figure 6:
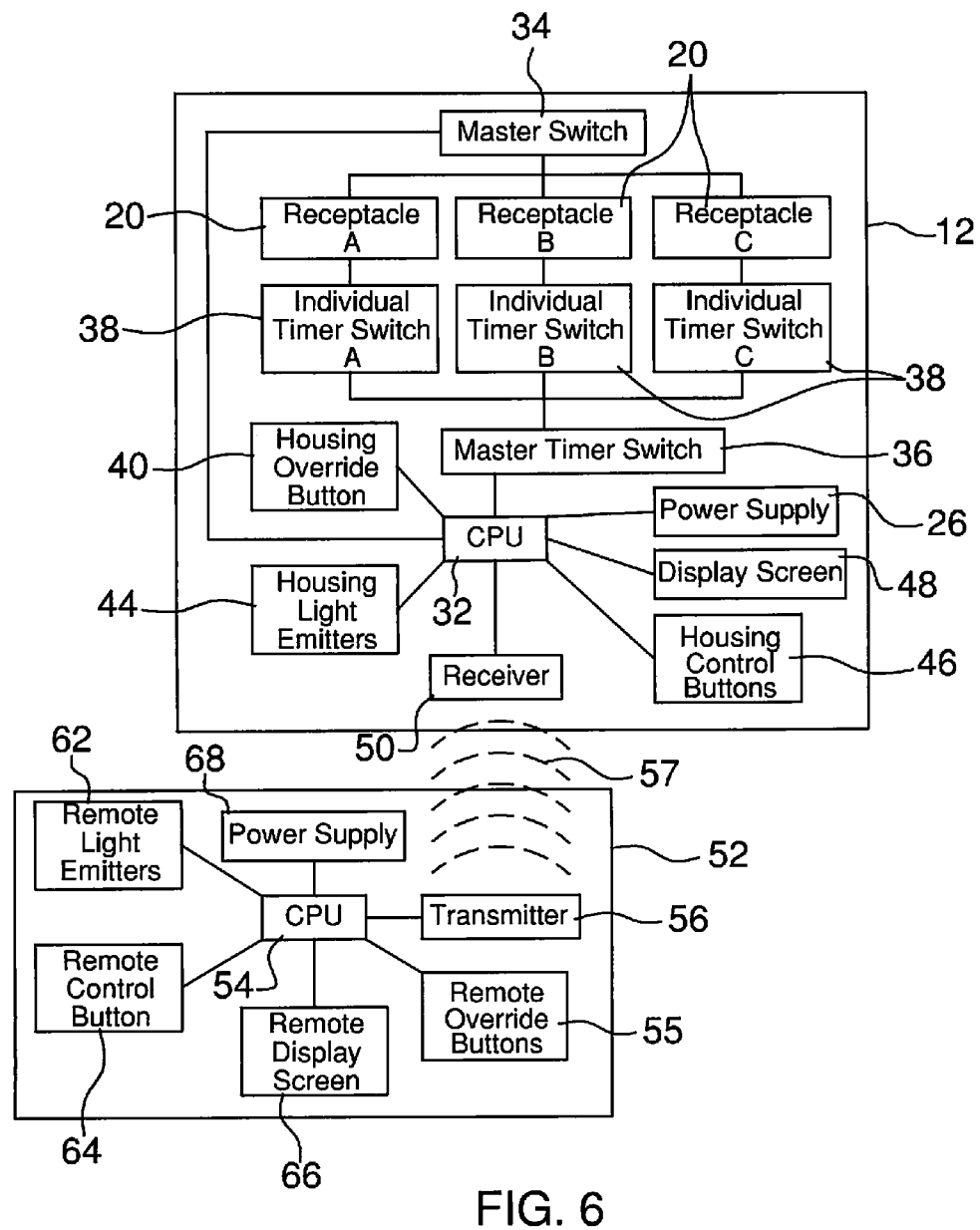
FIG. 6 is a schematic block diagram of an embodiment of the disclosure.

A plurality of electrical outlet receptacles 20 is disposed within the housing 12 and extends through the top wall 14. Each of the receptacles 20 has a plurality of openings 22 therein wherein each of the openings 22 is configured to receive a male plug-in end of an external electrical device. The receptacles 20 may be arranged into either a single row of receptacles 20, as shown in FIGS. 1, 3 and 5, or alternatively, into multiple rows of receptacles 20. The Figures show the housing 12 having between three and six of the receptacles 20, though the housing 12 may include as few as two receptacles 20 or greater than six receptacles 20. A power supply 26 is electrically coupled to each of the receptacles 20. The power supply 26 may comprise a power cord 28 having a male end portion 30 wherein the male end portion 30 is configured to be plugged into an external electrical outlet for supplying power to each of the receptacles 20.

A housing processor 32 is mounted in the housing 12 and is electrically coupled to the power supply 26. A master switch 34 is electrically coupled to the housing processor 32. The master switch 34 is electrically coupled to each of the receptacles 20 wherein manipulation of the master switch 34 selectively supplies power to the receptacles 20 through the power supply 26. In this manner, the master switch 34 determines whether power is supplied to any of the receptacles 20 at all. Thus, when the master switch 34 is activated, power may be supplied to one or more of the receptacles 20. However, when the master switch 34 is deactivated, power is not supplied to any of the receptacles 20.

A main timer switch 36 is coupled to the housing 12. The main timer switch 36 is electrically coupled to the housing processor 32 wherein the main timer switch 36 selectively provides power to the receptacles 20 for a selectable period of time. A plurality of individual timer switches 38 is provided. Each individual timer switch 38 is electrically coupled to an associated receptacle 20 wherein manipulation of one of the individual timer switches 38 selectively provides power to the associated one of the receptacles 20 for a selectable period of time. In this manner, the individual timer switches 38 permit selective timing control of the associated receptacles 20 and allow the user to override the main timer switch 36 for a particular receptacle 20 as desired.

A plurality of housing override buttons 40 is coupled to the housing 12. Each of the housing override buttons 40 is positioned proximate an associated one of the individual timer switches 38. Each of the housing override buttons 40 is electrically coupled to the housing processor 32 and the associated individual timer switch 38 wherein manipulation of one of the housing override buttons 40 opens the associated individual timer switch 38 when the associated individual timer switch 38 is closed and closes the associated individual timer switch 38 when the associated individual timer switch 38 is open. Housing indicia 42 may be positioned on each of the housing override buttons 40 to help visually differentiate between each of the housing override buttons 40.

A plurality of housing light emitters 44 is provided. Each of the housing light emitters 44 is mounted in an associated one of the housing override buttons 40. The housing light emitters 44 are electrically coupled to the housing processor 32 and an associated one of the individual timer switches 38. Each housing light emitter 44 emits a first color of light when the associated individual timer switch 38 is opened and emits a second color of light when the associated individual timer switch 38 is closed.

A pair of housing control buttons 46 is coupled to the housing 12. The housing control buttons 46 are electrically coupled to the housing processor 32 wherein manipulation of the housing control buttons 46 selectively controls an amount of time power is supplied to the receptacles 20. In particular, the housing control buttons 46 may independently control the timing functions of the main timer switch 36 and the individual timer switches 38. A housing display screen 48 is coupled to the housing 12. The housing display screen 48 is electrically coupled to the housing processor 32 and may display timing information, such as, for example, time remaining before deactivation of the main timer switch 36, the individual timer switches 38 or the like.

A receiver 50 is coupled to the housing 12. The receiver 50 is electrically coupled to the housing processor 32. A remote 52 is provided. A remote processor 54 is mounted in the remote 52. A transmitter 56 is coupled to the remote 52. The transmitter 56 is communicatively coupled to the receiver 50 wherein the transmitter 56 selectively sends an associated timing control signal 57 to the receiver 50. The timing control signal 57 may relate to activating or deactivating either the main timer switch 36 or the individual timer switches 38.

A plurality of remote override buttons 58 is coupled to the remote 52. Each of the remote override buttons 58 is electrically coupled to the remote processor 54 and an associated one of the individual timer switches 38. The transmitter 56 sends an associated one of the timing control signals 57 to the receiver 50 upon manipulation of one of the remote override buttons 58 wherein the associated timing control signal 57 causes the remote processor 54 to selectively open and/or close the associated individual timer switch 38. Remote indicia 60 may be positioned on each of the remote override buttons 58 to help visually differentiate between each of the remote override buttons 58.

A remote light emitter 62 is mounted in each of the remote override buttons 58. The remote light emitters 62 are electrically coupled to the remote processor 54 and an associated one of the individual timer switches 38. Each of the remote light emitters 62 emits a first color of light when an associated the individual timer switch 38 is opened and emits a second color of light when the associated individual timer switch 38 is closed. The first color of light emitted from the remote light emitters 62 may correspond to the first color of light emitted from the housing light emitters 44. Similarly, the second color of light emitted from the remote light emitters 62 may correspond to the second color of light emitted from the housing light emitters 44. Thus, for example, both the remote light emitters 62 and the housing light emitters 44 may emit a red light to indicate that the associated individual timer switch 38 is opened, while both the remote light emitters 62 and the housing light emitters 44 may emit a green light to indicate that the associated individual timer switch 38 is closed.

A pair of remote control buttons 64 is coupled to the remote 52. Each of the remote control buttons 64 is electrically coupled to the remote processor 54 wherein manipulation of the remote control buttons 64 causes the transmitter 56 to send the receiver 50 an associated one of the timing control signals 57 to selectively control the amount of time power is supplied to the receptacles 20. Similar to the housing control buttons 46, the remote control buttons 64 may independently control the timing functions of the main timer switch 36 as well as the individual timer switches 38.

A remote display screen 66 is coupled to the remote 52. The remote display screen 66 is electrically coupled to the remote processor 54 and may display timing information, such as, for example, time remaining before deactivation of the main timer switch 36, the individual timer switches 38 or the like. A power source 68 is mounted in the remote 52. The power source 68 is electrically coupled to the remote processor 54 and is configured to deliver power to the remote processor 54. The power source 68 may comprise at least one battery.

In use, as stated above and shown in the Figures, the master switch 34 is manipulated to provide power to the receptacles 20. The main timer switch 36 is manipulated to place the receptacles 20 on a single timer. The individual timer switches 38 are then set to override the main timer switch 36 as desired. In this manner, each of the receptacles 20 can be independently controlled by the associated individual timer switches 38. The remote 52 can be used to wirelessly control the timing functions of the main timer switch 36 as well as the individual timer switches 38.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A timed electrical power strip assembly comprising:
   a power strip housing having a top wall, a bottom wall and a peripheral wall attached to and extending between said top and bottom walls;
   a plurality of electrical outlet receptacles disposed within said housing and extending through said top wall, each of said receptacles having a plurality of openings therein wherein each of said openings is configured to receive a male plug-in end of an external electrical cord;
   a plurality of individual timer switches, each said individual timer switch being electrically coupled to an associated said receptacle wherein manipulation of one of said individual timer switches selectively provides power to said associated one of said receptacles for a selectable period of time;
   a power supply electrically coupled to each of said receptacles;
   a housing processor mounted in said housing, said housing processor being electrically coupled to said power supply;
   a master switch electrically coupled to said housing processor, said master switch being electrically coupled to each of said receptacles wherein manipulation of said master switch selectively supplies power to said receptacles through said power supply;
   a receiver coupled to said housing, said receiver being electrically coupled to said housing processor;

a remote;
a remote processor mounted in said remote;
a transmitter coupled to said remote, said transmitter being communicatively coupled to said receiver wherein said transmitter selectively sends an associated timing control signal to said receiver; and
a plurality of remote override buttons coupled to said remote, each of said remote override buttons being electrically coupled to said remote processor and an associated one of said individual timer switches, said transmitter sending an associated one of said timing control signals to said receiver upon manipulation of one of said remote override buttons wherein said associated timing control signal causes said remote processor to selectively open said associated individual timer switch.

2. The assembly of claim 1, further comprising said receptacles being arranged into a single row of said receptacles.

3. The assembly of claim 1, further comprising said housing including at least three of said receptacles.

4. The assembly of claim 1, further comprising a plurality of housing override buttons being coupled to said housing, each of said housing override buttons being positioned proximate an associated one of said individual timer switches, each of said housing override buttons being electrically coupled to said housing processor and an associated one of said individual timer switches wherein manipulation of one of said housing override buttons selectively opens said associated individual timer switch.

5. A timed electrical power strip assembly comprising:
a power strip housing having a top wall, a bottom wall and a peripheral wall attached to and extending between said top and bottom walls;
a plurality of electrical outlet receptacles disposed within said housing and extending through said top wall, each of said receptacles having a plurality of openings therein wherein each of said openings is configured to receive a male plug-in end of an external electrical cord;
a plurality of individual timer switches, each said individual timer switch being electrically coupled to an associated said receptacle wherein manipulation of one of said individual timer switches selectively provides power to said associated one of said receptacles for a selectable period of time;
a power supply electrically coupled to each of said receptacles;
a housing processor mounted in said housing, said housing processor being electrically coupled to said power supply;
a master switch electrically coupled to said housing processor, said master switch being electrically coupled to each of said receptacles wherein manipulation of said master switch selectively supplies power to said receptacles through said power supply;
a plurality of housing override buttons being coupled to said housing, each of said housing override buttons being positioned proximate an associated one of said individual timer switches, each of said housing override buttons being electrically coupled to said housing processor and an associated one of said individual timer switches wherein manipulation of one of said housing override buttons selectively opens said associated individual timer switch; and
a plurality of housing light emitters, each of said housing light emitters being mounted in an associated one of said housing override buttons, said housing light emitters being electrically coupled to said housing processor and an associated one of said individual timer switches.

6. The assembly of claim 5, further comprising each said housing light emitter emitting a first color of light when an associated said individual timer switch is opened, each said housing light emitter emitting a second color of light when said associated individual timer switch is closed.

7. The assembly of claim 1, further comprising a pair of housing control buttons coupled to said housing, said housing control buttons being electrically coupled to said housing processor wherein manipulation of said housing control buttons selectively controls an amount of time power is supplied to said receptacles.

8. The assembly of claim 1, further comprising a housing display screen coupled to said housing, said housing display screen being electrically coupled to said housing processor.

9. The assembly of claim 1, further comprising a pair of mounting holes positioned in said housing, said mounting holes being configured for receiving a fastener therethrough for releasably mounting said housing to a supporting surface.

10. The assembly of claim 1, further comprising:
a receiver coupled to said housing, said receiver being electrically coupled to said housing processor;
a remote;
a remote processor mounted in said remote; and
a transmitter coupled to said remote, said transmitter being communicatively coupled to said receiver wherein said transmitter selectively sends an associated timing control signal to said receiver.

11. The assembly of claim 1, further comprising a remote light emitter mounted in each of said remote override buttons, said remote light emitters being electrically coupled to said remote processor and an associated one of said individual timer switches.

12. The assembly of claim 11, further comprising each said remote light emitter emitting a first color of light when an associated said individual timer switch is opened, each said remote light emitter emitting a second color of light when said associated individual timer switch is closed.

13. The assembly of claim 1, further comprising a pair of remote control buttons being coupled to said remote, each of said remote control buttons being electrically coupled to said remote processor wherein manipulation of said remote control buttons causes said transmitter to send said receiver an associated one of said timing control signals to selectively control the amount of time power is supplied to said receptacles.

14. The assembly of claim 1, further comprising a remote display screen coupled to said remote, said remote display screen being electrically coupled to said remote processor.

15. The assembly of claim 1, further comprising a power source mounted in said remote, said power source being electrically coupled to said remote processor and being configured to deliver power to said remote processor.

16. A timed electrical power strip assembly comprising:
a power strip housing having a top wall, a bottom wall and a peripheral wall attached to and extending between said top and bottom walls, said housing being elongated;
a plurality of electrical outlet receptacles disposed within said housing and extending through said top wall, each of said receptacles having a plurality of openings therein wherein each of said openings is configured to receive a male plug-in end of an external electrical device, said receptacles being arranged into a single row of said receptacles, said housing including six of said receptacles;
a housing processor mounted in said housing;
a power supply electrically coupled to each of said receptacles, said power supply comprising a power cord having a male end portion wherein said male end portion is configured to be plugged into an external electrical outlet for supplying power to each of said receptacles, said power supply being electrically coupled to said housing processor;

a master switch electrically coupled to said housing processor, said master switch being electrically coupled to each of said receptacles wherein manipulation of said master switch selectively supplies power to said receptacles through said power supply;

a main timer switch coupled to said housing, said main timer switch being electrically coupled to said housing processor wherein said main timer switch selectively provides power to said receptacles for a selectable period of time;

a plurality of individual timer switches, each said individual timer switch being electrically coupled to an associated said receptacle wherein manipulation of one of said individual timer switches selectively provides power to said associated one of said receptacles for a selectable period of time;

a plurality of housing override buttons being coupled to said housing, each of said housing override buttons being positioned proximate an associated one of said individual timer switches, each of said housing override buttons being electrically coupled to said housing processor and an associated one of said individual timer switches wherein manipulation of one of said housing override buttons selectively opens said associated individual timer switch;

a plurality of housing light emitters, each of said housing light emitters being mounted in an associated one of said housing override buttons, said housing light emitters being electrically coupled to said housing processor and an associated one of said individual timer switches, each said housing light emitter emitting a first color of light when an associated said individual timer switch is opened, each said housing light emitter emitting a second color of light when said associated individual timer switch is closed;

housing indicia being positioned on each of said housing override buttons, said housing indicia being configured to visually differentiate between each of said housing override buttons;

a pair of housing control buttons coupled to said housing, said housing control buttons being electrically coupled to said housing processor wherein manipulation of said housing control buttons selectively controls an amount of time power is supplied to said receptacles;

a housing display screen coupled to said housing, said housing display screen being electrically coupled to said housing processor;

a pair of mounting holes positioned in said housing, said mounting holes extending into said bottom wall of said housing and being configured for receiving a fastener therethrough for releasably mounting said housing to a supporting surface;

a receiver coupled to said housing, said receiver being electrically coupled to said housing processor;

a remote;

a remote processor mounted in said remote;

a transmitter coupled to said remote, said transmitter being communicatively coupled to said receiver wherein said transmitter selectively sends an associated timing control signal to said receiver;

a plurality of remote override buttons coupled to said remote, each of said remote override buttons being electrically coupled to said remote processor and an associated one of said individual timer switches, said transmitter sending an associated one of said timing control signals to said receiver upon manipulation of one of said remote override buttons wherein said associated timing control signal causes said remote processor to selectively open said associated individual timer switch;

a remote light emitter mounted in each of said remote override buttons, said remote light emitters being electrically coupled to said remote processor and an associated one of said individual timer switches, each said remote light emitter emitting a first color of light when an associated said individual timer switch is opened, each said remote light emitter emitting a second color of light when said associated individual timer switch is closed, said first color of light emitted from said remote light emitters corresponding to said first color of light emitted from said housing light emitters, said second color of light emitted from said remote light emitters corresponding to said second color of light emitted from said housing light emitters;

remote indicia being positioned on each of said remote override buttons, said remote indicia being configured to visually differentiate between each of said remote override buttons;

a pair of remote control buttons being coupled to said remote, each of said remote control buttons being electrically coupled to said remote processor wherein manipulation of said remote control buttons causes said transmitter to send said receiver an associated one of said timing control signals to selectively control the amount of time power is supplied to said receptacles;

a remote display screen coupled to said remote, said remote display screen being electrically coupled to said remote processor; and a power source mounted in said remote, said power source being electrically coupled to said remote processor and being configured to deliver power to said remote processor, said power source comprising at least one battery.

* * * * *